Jan. 27, 1959     B. F. VOIGT     2,870,607
SUPERCHARGING AND COMPENSATING HYDRAULIC PRESSURE GENERATOR
Filed July 22, 1955
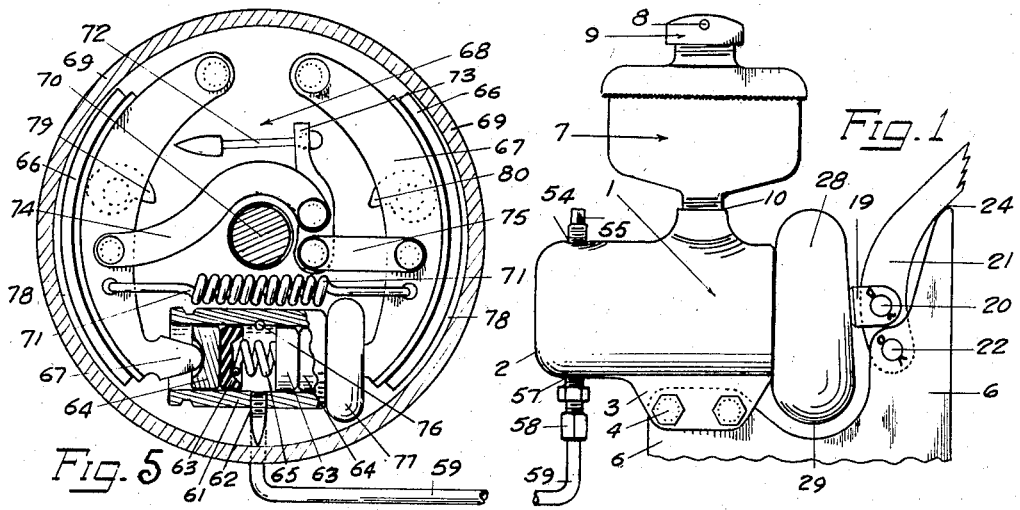
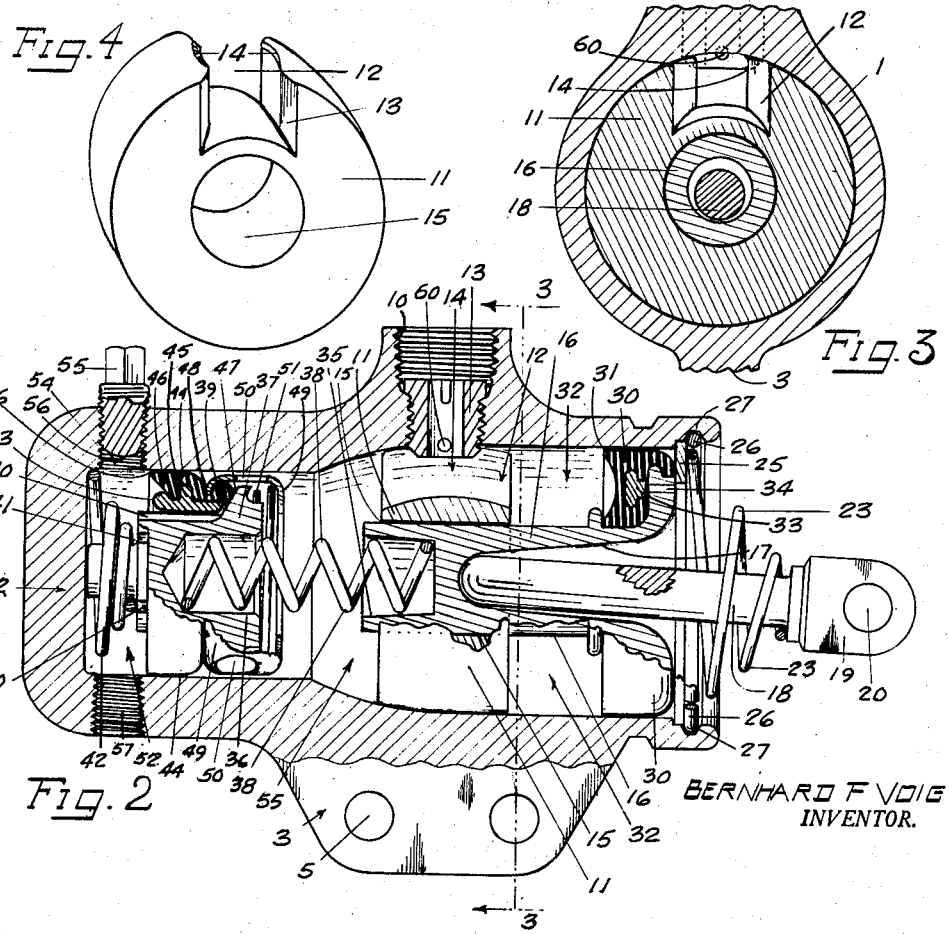
BERNHARD F VOIGT
INVENTOR.

United States Patent Office 2,870,607
Patented Jan. 27, 1959

2,870,607

SUPERCHARGING AND COMPENSATING
HYDRAULIC PRESSURE GENERATOR

Bernhard F. Voigt, Corvallis, Oreg.

Application July 22, 1955, Serial No. 523,830

2 Claims. (Cl. 60—54.6)

This invention relates to improvements in fluid transmission systems and more particularly to a fluid pressure generator fluidly interconnected with one or more fluid pressured reacting motors or other fluid pressure sensitive devices, and is particularly adapted to a use wherein forces from without are converted to fluid pressures and displacements, transmitted and reconverted to external forces, and thereby apply and release said forces one to the other, wherein, as in friction brakes and clutches or in machines for cutting or grinding or the like, a removal of material coincidental to or inherent with normal operations constitutes an operational loss of material, and wherein normal fluid pressures may be reversed by thermo-contraction, upon adjustment by manual or automatic means, or with a mechanical or other system overriding such a fluid transmission system.

The invention is hereinafter shown and described as a master cylinder in connection with a fluid operated, manually adjusted and mechanically overrode automotive brake system. The objects of my invention are:

To establish and limit to a predetermined value a static pressure in the system and to maintain at all times the system under positive fluid pressure within the limits of operational temperature and movement range regardless of the effects of thermo expansion and contraction, adjustments for loss of material or by the override of the fluid means by other means, and to create, maintain and regulate such pressures supplementary to and by normal operation.

To supercharge, that is, to add fluid in excess of requirements during applications and upon releases thereof, by means of a novel fluid passageway, rendered dynamic by intraconstriction, cooperating with a novel internal spring pressured valved-piston to generate, maintain and limit said supercharging.

To provide fluid compensations, that is, a return of fluid in excess of requirements to a reservoir or a withdrawal of fluid therefrom to make up an insufficiency.

To provide by means of a novel-two-way sealing, self-expediting valved-piston, smooth fluid-displacement fluid-pressure transition.

To provide clear and direct transfer of fluid pressure and displacement between generator and motor pressure sealing cup to pressure sealing cup without interposed valve, relay or other attenuating device.

To provide for the elimination of gas and against its reintroduction into the system.

To provide fluid compensation for all adjustments made automatically or manually.

To increase the mechanical efficiency of the system and to provide increasing mechanical advantage to the operator with increasing pressure development movement and to reduce the extent of increased movement normally accompanying unadjusted operational loss of material.

To reduce the possibility of leakage at, and the wear on, the cylinder walls of the generator by providing an internal stabilizing bearing interposed to absorb any side thrust thereto, eliminate any necessity of a non-resilient contact therewith, and permit a simplified two-way sealing thereof.

To eliminate localized groove cutting by fluid wire-drawing such as is common with the use of a piston sealing cup and port combination as a compensating valve means.

The foregoing and other objects will appear as my invention is more fully hereinafter described in the following specification, illustrated in the accompanying drawings, and finally pointed out in the appended claims.

In the drawing:

Figure 1 is a side view of a fluid pressure generator or master cylinder made in accordance with my invention and as interconnected between an attached surge changer or reservoir and the fluid connection leading to a pressure sensitive system such as one containing reacting fluid motors or a fluid operated brake.

Figure 2 is an enlarged view of the master cylinder, disconnected from the system, with fragments broken away, and parts in section for convenience of illustration.

Figure 3 is a sectional end view taken along the line 3—3 of Figure 2.

Figure 4 is a perspective view of a stabilizing bearing having a longitudinally intra-constricted slot formed therein.

Figure 5 is a side view of a common fluid motor or hydraulic wheel brake with eccentric adjustments, mechanical override, parts omitted and other parts in section for the convenience of illustration, simplification and clarification of the objects of my invention.

Referring more particularly to the drawing:

In Figures 1 to 4, reference numeral 1 indicates generally a cylindrically hollowed casting open at one end and closed by an end wall 2 at the other and having a dependent flange 3 for bolt and nut 4 per hole 5 or other approved attachment to a structural element 6 of a vehicle or other suitable support, and reference numeral 7 indicates generally a surge chamber and reservoir so located and vented as at 8 by its filler-opening closure cap 9 or otherwise arranged so as to maintain through its connection to the invention as at 10 a slight hydrostatic pressure therein and to permit operational surgings of fluid therebetween without a loss of fluid.

Two cylinders of the same or different diameters are formed within the casting and are rendered steeple compound by a collar 11, and reference numeral 12 indicates generally a continuously intra-constricted slot formed longitudinally in the periphery of the collar to provide fluid communication between said cylinders and through a hollow screw 13, which secures the collar in place by projection into indents on the sides of the slot at its point of greatest constriction as at 14, with the reservoir. The collar is bored axially concentric with the cylinders and said bore is finished to convert the collar into a guide and stabilizing bearing as at 15 for a plunger 16 bored inwardly on a taper from its outer end as indicated at 17 and within which is operatively disposed a rod 18 whose one end bears against the inner end of the bore and whose opposite end is formed into a clevis 19 which is pivotally attached as at 20 to an operating lever 21. The operating lever is pivotally attached as at 22 to said structural member 6 and terminates in any approved manner such as a brake pedal (not shown) which when pushed anti-clockwise or to the left, as viewed in the drawing, will, with increasing mechanical advantage favoring the manipulator, impart otherwise corresponding force and movement to the plunger 16. An anti-rattle spring 23, which holds the operating lever when it is fully released against its stop 24, bears at one of its ends against the clevis 19 and at its opposite end against a retaining washer or grommet 25 which limits the outward movement of the plunger 16, and which is secured within the cylinder by means of an expansion ring 26 locked within an annular groove 27. This end of the casting, the spring 23 and the connecting rod 18 are enclosed in a flexuous protective boot 28 having an air vent 29 formed therein.

The outer end of the plunger 16 is surrounded by an elastic sealing element 30 which is secured in place by its annular lands and grooves cooperating with those formed with this plunger's enlargement and which is concave-faced toward said guide bearing 11 to seal as at 31 against fluid leakage from an operatively variable fluid space 32 thus formed about the plunger, and clasps in its interior a non-resilient annular insert 33 which posteriorly faces air venting holes 34 that are provided through said enlargement to permit a greater pressure without to move the insert toward a reduction of the concavity of the face of the sealing element, whereby the seal is pressed tighter to the cylinder to prevent negative pressured and inertia induced leakage and to form a braking means to retard free outward movements of the plunger 16.

The inner end of said plunger 16 is formed with a bore 35 which cooperates with an aligned bore 36 in the body 37 of a valved piston to provide a housing for a compression spring 38 which normally urges said piston and plunger apart. By reduction of said body 37 on a taper, a valve face is formed as at 39 and the minimum diameter is extended toward the closed end of the cylinder to provide a valve stem which is longitudinally grooved for fluid passageways as at 40 and is further reduced in diameter as at 41 to receive one end of a compression spring 42 whose opposite end bears against the end wall 2 to urge the body 37 counter to the urge of the hereinafter called secondary spring 38. A collar 43 surrounds the valve stem and is surrounded by an elastic sealing element 44 which is held in place by an annulus 45 and which concentrically positions the collar to serve as a valve guide and said valve guide has a valve seat facing the valve face at 39 to cooperate therewith and form a valve means. The sealing element 44 extends beyond the valve guide to form a lipped primary seal as at 46 and also extends beyond the valve seat as at 47 to form an elastic preseating seal and valve opening expeditor for the valve means, and is grooved as at 48 for the engagement of one end-bell of a retaining sleeve and valve opening protector 49 of belled channel formation in cross-section which is rendered porous by a plurality of openings 50. A light compression spring 51 is interposed between the other end-bell of the retaining sleeve 49 and the back of the valve to normally urge the valve guide over the valve stem and toward the face of the valve and closure to fluid passage therebetween. The sealing element about the valve guide, the retaining sleeve and the valve closure spring in combination with the valve and its stem comprise a valved piston operatively disposed upon and by its own poppet valve, and a means by which a primary fluid space 52 between it and the end wall and an intermediate fluid space 53 between it and the guide bearing are made operatively variable. An upper outlet 54 is fitted with a rounded screw plug 55 to form an air trap 56, from which all air collected therein can be bled by manipulation of the plug. An additional outlet 57 opening into the primary fluid space is fluidly interconnected by suitable fittings such as 58 and fluid conduit 59 with fluid reacting motors or other fluid sensitive devices. The hollow screw 13 is provided with one or more transverse holes 60 for the escape of air trapped by its projection into the slot 12.

The particular structural features of a "Hydraulic Brake," as a fluid operated automotive wheel braking means embodied in a fluid transmission system is commonly called, may take a number of forms and one form has been selected for depicting the present invention. Such a form comprises, as shown in Figure 5, a cylinder 61 fluidly interconnected as at 62 by the conduit 59 to such a system and sealed from leakage by simple piston cups 63 which are held in position against movable pistons 64 by a compression spring 65. Frictional materials or brake linings 66 are secured to brake shoes 67 which are hinged to and anchored by a stationary backing plate as shown generally at 68 and are frictionally engaged by fluid means in use as a service brake with a brake drum 69 to retard its movement with or about an axle or hub 70 by fluid pressures and displacements generated within the master cylinder forcing the pistons to move the brake shoes counter to the urge of the retracting means or brake shoe retracting spring 71 and as a parking or emergency brake by an overriding mechanical means whereby application through a suitable lever (not shown) draws a cable 72 to the left as viewed in the drawing and corresponding movements of the arm 73 causes centrifuged movements of the straps 74 and 75 and the brake shoes. An opening 76 in the cylinder is fitted with a suitable screw (not shown) for air bleeding and the outer ends of the cylinder are enclosed in a protective boot 77. Operational loss of material and corresponding increased clearance between the drum and the lining as shown at 78 is offset by manipulated movement of the eccentric adjustment cams 79 and 80 whereby the shoes are held closer to the drum when retracted by the brake retracting spring and the fluid displacement necessary before the molecular transfer of force by the hydraulic principle is correspondingly reduced when application of the brake is made by fluid means. Said adjustments, fluid thermo-contraction and overriding mechanical application or other non-operational fluid displacement may permit the outward movement of the sealing cups by their positioning spring, the loss of an effective seal and the introduction of air to reduce the effectiveness of the system unless said changes in displacement are fully and automatically compensated for by the fluid pressure generator and said transfer of fluid and pressure is at all times unattenuated and unimpeded by valves or other pressure relays. Therefore, in addition to the development of operational fluid pressures and displacement, the assurance of a pressure lower than that developed by the brake return spring or other reacting means but sufficient to maintain a sealing tension at the cups under all conditions within operational range of temperature and movement and hereinafter called "a static pressure" is considered a necessary and proper function of a fluid pressure generator in such and other fluid pressure sensitive transmission systems.

The strength and length of the primary spring 42, the secondary spring 38, and the brake shoe retracting spring 71 are so proportioned to each other that, with the release of application whereupon the operative lever returns back (to the right as viewed in the drawing) to its fully inoperative position, the retracting spring is capable of returning all fluid displaced by any prior application and develops sufficient fluid pressure, with the assistance of the primary spring, to move the valved-piston back against the force remaining in the secondary spring after the plunger component 16 has been forced against its retaining washer 25, until the retainer sleeve 49 has abutted the guide bearing and were said release made quickly and additional supercharge induced thereby by fluid inertia, to be further capable upon said abutments of forcing the valve open against the valve closure means and thereby relieve any supercharge greater than needed for static pressure as predetermined by the area presented by the valve, and the secondary spring is so proportioned to the primary spring that with the release of application if ever the fluid pressures in the primary and intermediate fluid spaces were made and kept equalized the valved piston would assume a position of equilibrium such that the volume of the intermediate fluid space then formed would exceed the maximum fluid displacement requirement of the system.

The operation of fluid transmission systems to which this invention appertains although necessarily aperiodic both in direction and extent can be classified simply as an application, holding or release thereof, and from the drawing and the foregoing it is readily apparent that:

Upon any continued application; whereby said pistoned plunger 16 moving inward decreases the volume of said secondary fluid space 32 and induces a supercharged flow into the lesser decreased volume of the intermediate fluid space 53, even though secondary spring 38 be compressed and the volume of the intermediate fluid space further decreased. A corresponding inward movement of said valved piston 37 is opposed by the primary spring 42 and static fluid pressure and deferred by fluid inertia in the primary fluid space 52. The fluid volume displaced in the intermediate fluid space plus said supercharge passes through said valve means whenever the fluid pressure in the intermediate fluid space exceeds the pressure in the primary fluid space to supply and supplement the fluid displacement required to place the brake shoes in firm contact with the brake drums.

Since the fluid displaced in bringing said inner end of said pistoned plunger in abutment with said valved piston approximates the fluid displacement necessary to apply brake shoes set with minimum operating clearance to the brake drums without said supercharged fluid displacement, it is readily apparent that said supercharging supplies increased displacement such as incurred by unadjusted-for wear on the brake lining with, proportionally, but slightly increased additional inward movement of the plunger. When the increased pedal travel normally accompanying unadjusted-for operational loss of material is to be ignored or the brake shoes are supplied with automatic clearance setters such as described in my co-pending applications, Serial Numbers 523,721 and 523,811, the need for slight additional inward movement with corresponding brake lining wear is eliminated, and the primary spring 42 may be mounted to operate against the collar 43 or the seal 44 instead of against the valve stem at 41 and the valve closing spring 51 thereby eliminated. The resultant reduced movement of the piston plunger 16 may then be utilized to increase the mechanical advantage of the operator, the operation of the invention remaining otherwise the same as heretofore and hereinafter described.

After the brake linings are brought into full contact with the brake drums, fluid displacement greatly decreases, said valve means closes and the forces applied to or released from the operating lever are correspondingly directly applied or released from the brake drums through said abutment of plunger and piston and responding fluid pressures generated within the primary fluid space, and any slight fluid displacements elastically incurred are fluidly adjustable through said compensating port 14 with the reservoir.

As the applied force is released upon the operating lever the force of the brake shoes on the brake drum is hydraulically correspondingly reduced until the brake shoe retracting springs move the brake shoes away from the drum and return the fluid to the primary fluid space thereby moving with the assistance of the primary spring said valved piston back to abut the guide bearing, whereupon any excess static pressure induced by supercharging can be discharged through said valve means and said compensating port 14 to the reservoir when the secondary spring returns said piston plunger to its full released position against its retainer.

However, when the release of an application is made more quickly than fluid inertia will permit the foregoing, the anti-rattle spring 23 returns the operating lever to its stop 24, the secondary spring 38 endeavors to move said pistoned plunger outward and said valved piston seeks a position of equilibrium. Outward movement of said pistoned plunger induces a flow through said intra-constricted fluid passageway 12 to dynamically supercharge the secondary fluid space 32 and to reduce the fluid pressure in the intermediate fluid space 53, thereby opening said valve, means and, through outward movement of said valved piston in seeking a position of equilibrium between the forces of the primary and secondary springs, establishes within the primary fluid space 52 an inertial fluid supercharge which when combined with fluid returned by the brake shoe retracting springs closes said valve means and moves said valved piston back to abut the guide bearing, whereupon excesses of said static pressures induced by supercharging can be then released as aforesaid.

While I have shown a particular form of embodiment of my invention I am aware that many minor changes therein will readily suggest themselves to others skilled in the art without departing from the spirit and scope of the invention. Having thus described my invention what I claim as new and desire to protect by Letters Patent is:

I claim:

1. A hydraulic pressure generator comprising in combination a horizontally disposed cylinder having a port, a fluid reservoir mounted upon the cylinder and in communication with the interior of the cylinder through said port, said cylinder being open at one of its ends and closed at its opposite end, a guide bearing fixedly secured within the cylinder intermediate the ends thereof and having a longitudinal slot therein, said slot having side walls converging from their ends toward the center thereof to provide a central restriction in the slot and so located that said port is in open communication with the slot at its central point of greatest restriction whereby as the velocity of fluid flow through said restriction increases the pressure in the restriction will decrease, a valved piston disposed within the cylinder between said closed end thereof and the corresponding end of the guide bearing to provide a primary fluid space between the closed end of the cylinder and the corresponding end of the valved piston and an intermediate fluid space between the opposite end of said piston and said corresponding end of the guide bearing, a plunger slidably mounted through said guide bearing and operable from the exterior of the cylinder for moving the valved piston toward the closed end of the cylinder, a sealing element carried by the outer end of the plunger to provide a secondary fluid space between the sealing element and the adjacent end of the guide bearing, a fluid conduit in open communication at one of its ends with said primary fluid space and adapted at its opposite end for attachment to and open communication with the interior of a brake cylinder, a first resilient means disposed within the primary fluid space bearing against the closed end of the cylinder and against the adjacent end of the valved piston, a second resilient means disposed within said intermediate fluid space and bearing against the opposite end of the valved piston and against the adjacent end of said plunger, said valved piston comprising a cylindrical body member having longitudinal grooves in its outer peripheral surface for controlled passage of fluid therethrough, valve means surrounding said body member normally sealing off said grooves and adapted to open the grooves upon movement in one direction relative to the body member, whereby movement of said plunger and sealing element toward said guide bearing will force fluid from said secondary fluid space through said restricted slot in the guide bearing to said intermediate fluid space and whereby said decrease in pressure at said point of greatest restriction in said slot will preclude flow of fluid from the secondary fluid space to the reservoir and whereby said movement of the valved piston by the plunger will increase the fluid pressure in the primary fluid space and said conduit and brake cylinder and whereby upon opposite movement of the valved piston the fluid pressure in the primary fluid space in cooperation with said first resilient means will move the valved piston into abutment with the guide bearing to thereby open said grooves to allow passage of fluid from the intermediate fluid space to the primary fluid space to compensate for operational fluid displacement therein.

2. A hydraulic pressure generator as claimed in claim 1 wherein said valved piston body member includes an annular valve at one end of said grooves, a collar slidably mounted on said body member and having a valve seat at one of its ends for cooperating with said valve, an annular sealing element secured to said collar and means carried by the collar and extending beyond one end of the valve body member for moving said collar away from said valve upon abutment of said last mentioned means with said guide bearing, and resilient means interposed between said last mentioned means and the valve body member for returning said valve seat to said valve.

References Cited in the file of this patent

UNITED STATES PATENTS

| | | |
|---|---|---|
| 2,057,706 | Carroll et al. | Oct. 20, 1936 |
| 2,102,834 | Carroll | Dec. 21, 1937 |
| 2,154,111 | Rossmann | Apr. 11, 1939 |
| 2,156,120 | La Brie | Apr. 25, 1939 |
| 2,211,403 | Boldt et al. | Aug. 13, 1940 |
| 2,232,350 | Swift | Feb. 18, 1941 |
| 2,280,153 | Loweke | Apr. 21, 1942 |
| 2,444,181 | Baldwin | June 29, 1948 |
| 2,508,403 | Knauss | May 23, 1950 |
| 2,649,692 | Stelzer | Aug. 25, 1953 |

FOREIGN PATENTS

| | | |
|---|---|---|
| 389,930 | Great Britain | Mar. 30, 1933 |